(12) United States Patent
Krzanowski

(10) Patent No.: US 7,860,022 B2
(45) Date of Patent: Dec. 28, 2010

(54) MULTIFUNCTIONAL CONTROL CHANNEL FOR PSEUDOWIRE EMULATION

(75) Inventor: Roman Krzanowski, White Plains, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 679 days.

(21) Appl. No.: 11/689,537

(22) Filed: Mar. 22, 2007

(65) Prior Publication Data

US 2008/0151895 A1 Jun. 26, 2008

Related U.S. Application Data

(60) Provisional application No. 60/871,209, filed on Dec. 21, 2006.

(51) Int. Cl.
*H04J 1/16* (2006.01)
*H04L 12/56* (2006.01)

(52) U.S. Cl. ............... 370/252; 370/254; 370/238; 370/389; 709/238

(58) Field of Classification Search ............. 370/252, 370/254, 352–356, 400, 401, 389, 238; 709/238–242
See application file for complete search history.

(56) References Cited

U.S. PATENT DOCUMENTS

| 2005/0220014 | A1 | 10/2005 | Delregno et al. | |
| 2007/0011352 | A1* | 1/2007 | Martini et al. | 709/239 |
| 2007/0286090 | A1* | 12/2007 | Rusmisel et al. | 370/252 |

* cited by examiner

*Primary Examiner*—John Pezzlo

(57) ABSTRACT

A system advertises a multifunctional control channel (MFCC) in an interface parameter sub-type-length-value (TLV) of an advertisement label mapping message that is dispatched to a network device. The system also processes a reply label mapping message that is transmitted from the network device in response to the advertisement label mapping message and updates a label information base to establish a pseudowire and a MFCC associated with the pseudowire.

20 Claims, 14 Drawing Sheets

US 7,860,022 B2

MULTIFUNCTIONAL CONTROL CHANNEL FOR PSEUDOWIRE EMULATION

RELATED APPLICATION

This application claims priority under 35 U.S.C. §119 based on U.S. Provisional Patent Application No. 60/871,209, filed Dec. 21, 2006, the disclosure of which is incorporated by reference herein in its entirety.

BACKGROUND INFORMATION

Legacy network systems, such as ones based on Frame Relay or Asynchronous Transfer Mode (ATM), may communicate with packet switched networks (PSN), such as an Internet Protocol (IP) switching network or a Multi-protocol Label Switching (MPLS) network, which provide pseudowire emulation (PWE). PWE and associated pseudowires may be managed and controlled by establishing and using control channels for the pseudowires.

However, each control channel may only serve specific functions for which it is established. To apply different types of control functions, the pseudowires may need to be re-established, which, in turn, can lead to downtime and increased operational cost of PWE-based services.

DETAILED DESCRIPTION OF PREFERRED EMBODIMENTS

The following detailed description refers to the accompanying drawings. The same reference numbers in different drawings may identify the same or similar elements. As used herein, the term "bidirectional forwarding detection" (BFD) may refer to continuous monitoring of a route or a data path for faults in both forward and reverse directions.

Implementations described herein may relate to establishment and/or use of a multifunctional control channel for sending control messages through pseudowires. A multifunctional control channel may serve many functions without re-establishing the pseudowire.

Figure 1:
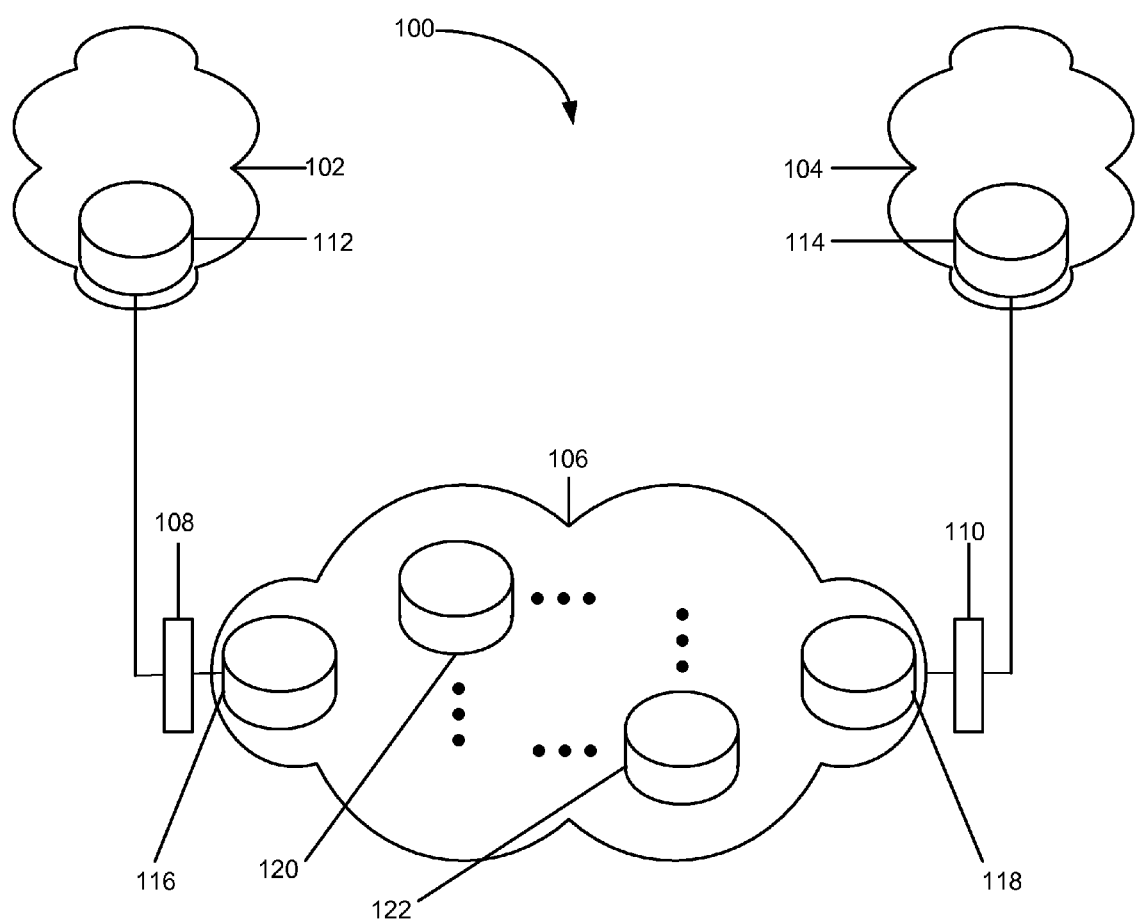
FIG. 1 shows, at the data link layer level, networks in which a multifunctional control channel may be implemented.

FIG. 1 shows, at a data link layer level (i.e., layer 2 in the Open Systems Interconnection (OSI) network model), a network 100 in which a multifunctional control channel may be implemented. Network 100 may include legacy networks 102 and 104, an IP/MPLS network 106, and attachment circuits 108 and 110.

Legacy networks 102 and 104 may include devices and/or systems for providing native network services such as, for example, Ethernet, ATM, Frame Relay, and/or Time-division Multiplexing (TDM). As further shown in FIG. 1, legacy networks 102 and 104 may include customer edge (CE) routers 112 and 114. CE routers 112 and 114 may include routers located on customer premises and may provide an entry into and/or an exit from legacy networks 102 and 104.

IP/MPLS network 106 may include devices and/or systems that provide fast switching of packets. As shown in FIG. 1, IP/MPLS network 106 may include provider edge (PE) routers 116 and 118 and provider switch (PS) routers 120 and 122. PE routers 116 and 118 may include routers that may provide an entry and/or an exit to and from IP/MPLS network 106. PS routers 120 and 122 may include routers that accept IP/MPLS packets and route them toward their destination devices.

Attachment circuits 108 and 110 may include ATM, Frame Relay, TDM, or other layer 2 transport. Packets to and from legacy networks 102 and 104 may pass through attachment circuits 108 and 110 to move into and out of IP/MPLS network 106.

Packets may depend on IP/MPLS network 106 to transport them from a device (e.g., CE router 112) in legacy network 102 to another device (e.g., CE router 114) in legacy network 104. In order to transport the packets that arrive through attachment circuits 108 and 110, IP/MPLS network 106 may establish network paths, known as pseudowires, and may route packets over the pseudowires.

The pseudowires may be managed by setting and using multifunctional control channels. A multifunctional control channel may serve many functions over the lifetime of a pseudowire, unlike a control channel that serves only predetermined functions. PE routers 116/118 and/or PS routers 120/122 may establish pseudowires, route packets over the pseudowires, set multifunctional control channels, and/or control the pseudowires over the multifunctional control channels.

Figure 2:
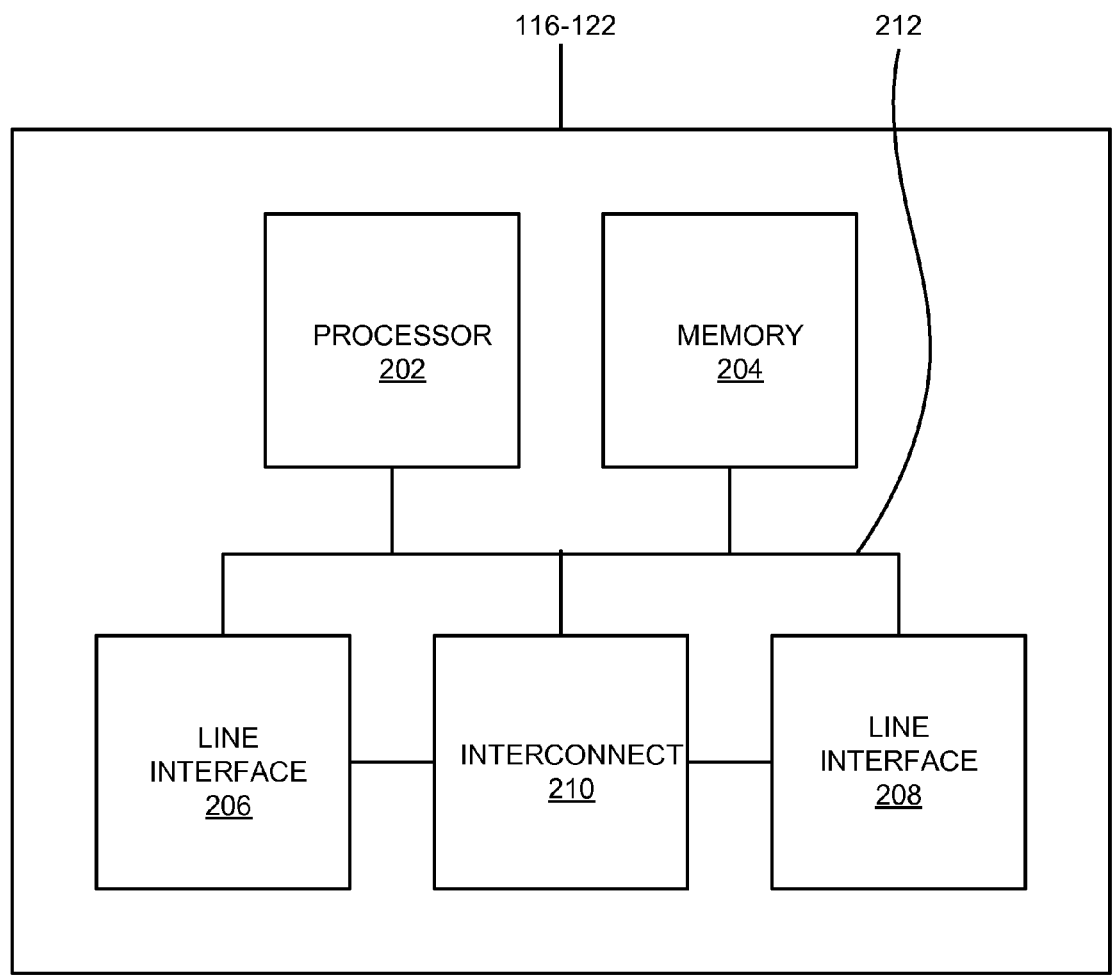
FIG. 2 is an exemplary block diagram of Provider Edge (PE) routers and Provider Switch (PS) routers of FIG. 1.

FIG. 2 illustrates an exemplary block diagram of PE routers 116/118 and PS router 120/122 of FIG. 1, hereinafter referred to as "PE/PS routers 116-122." Each of PE/PS routers 116-122 may include a processor 202, memory 204, line interfaces 206 and 208, an interconnect 210, and a bus 212.

Processor 202 may include one or more processors, microprocessors, and/or processing logic optimized for networking and communications. Processor 202 may process packets and/or network path-related information. Memory 204 may include static memory, such as read only memory (ROM), dynamic memory, such as random access memory (RAM), and/or onboard cache, for storing data and machine-readable instructions. Memory 204 may also include storage devices, such as a floppy disk, a CD ROM, a CD read/write (R/W) disc, and/or flash memory, as well as other types of storage devices. Line interfaces 206 and 208 may include devices for receiving incoming packets from networks and for transmitting packets to networks. Interconnect 210 may include switches for conveying an incoming packet from line interface 206 to line interface 208 based on a packet destination and stored path information. Examples of interconnect 210 may include a communication bus and a switch fabric. Bus 212 may include a path, in addition to line interfaces 206 and 208, that permits communications among components of each of PE/PS routers 116-122.

Figure 3:
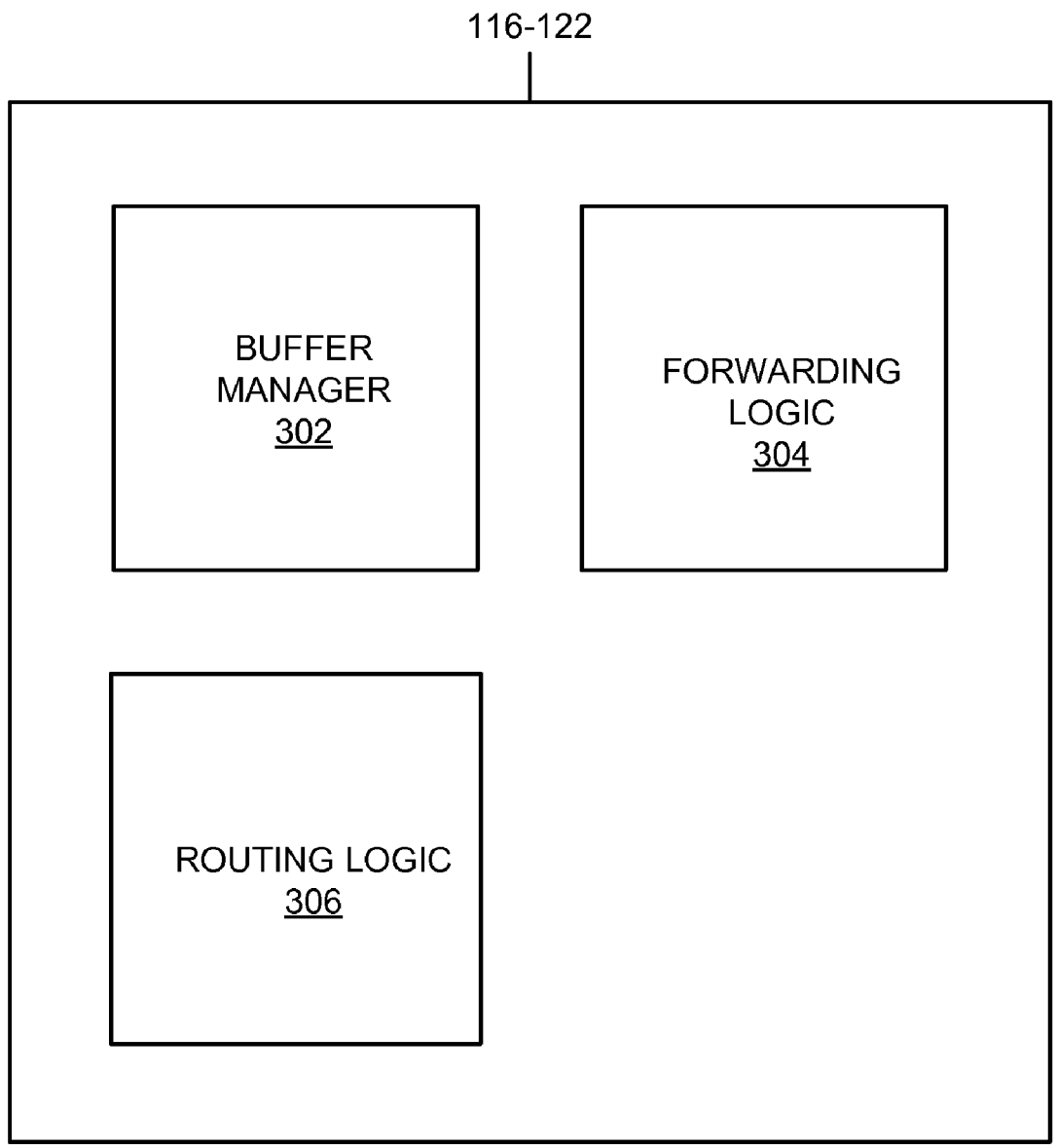
FIG. 3 is an exemplary functional block diagram of components included in and/or implemented by PE and PS routers of FIG. 1.

FIG. 3 is an exemplary functional block diagram of components included in or implemented by each of PE/PS routers 116-122 of FIG. 1. As shown, PE/PS routers 116-122 may include a buffer manager 302, forwarding logic 304, and routing logic 306. Buffer manager 302 may provide a buffer for queuing incoming packets. If packets arrive simultaneously, one or more of the packets may await in the buffer until higher priority packets are processed and/or transmitted. Forwarding logic 304 may include hardware and/or software for directing a packet to a proper output port on line interface 208 based on routing information. Routing logic 306 may include hardware and/or software for communicating with other routers to gather and store routing information in a LIB.

Figure 4:
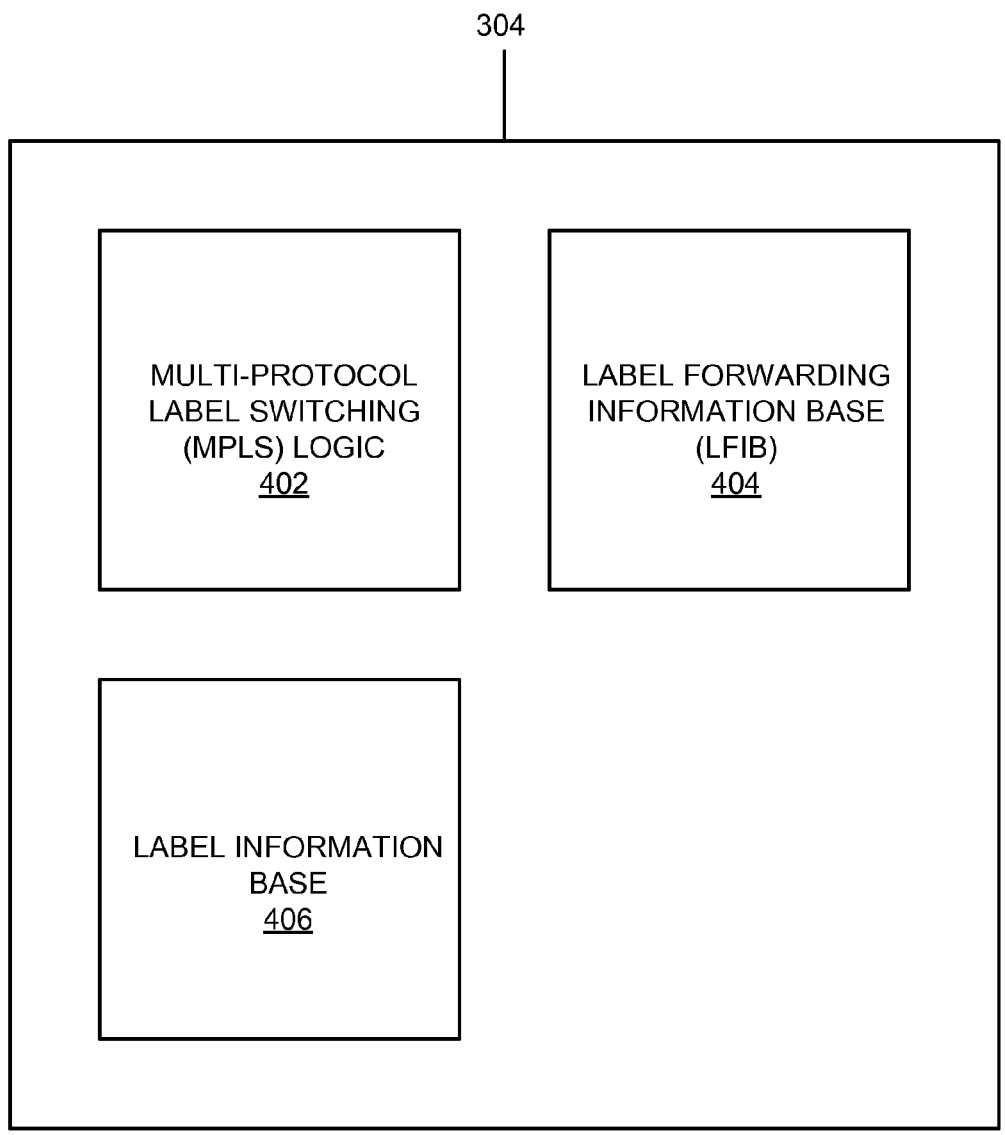
FIG. 4 is an exemplary functional block diagram of the forwarding logic of FIG. 3.

FIG. 4 is an exemplary functional block diagram of forwarding logic 304 of FIG. 3. As shown, forwarding logic 304 may include MPLS logic 402, a label forwarding information base (LFIB) 404, and a label information base (LIB) 406. MPLS logic 402 may include hardware and/or software for examining the header of an incoming packet and for sending the packet to the proper output port, based on the header information and path/routing information stored in LFIB 404 and LIB 406. LFIB 404 and LIB 406 may include a table and/or a database of network paths, called Label Switched Paths (LSPs), and/or routing information. LFIB 404 may contain more frequently used portions of LIB 406 and may be smaller than LIB 406.

MPLS logic 402 may perform different routing procedures, depending on whether its host router is operating as PE router 116, PE router 118, PS router 120, or PS router 122. It is possible for the host router to operate as PE router 116 or PS router 120 at different instances, depending on an incoming packet and its network configuration. If the host router operates as PE router 116, MPLS logic 402 may convert a packet that enters network 106 into a MPLS packet, by adding a MPLS header, as described below, to the packet. Conversely, MPLS logic 402 may convert a MPLS packet that exits network 106 by stripping away its MPLS header.

Figure 5A:
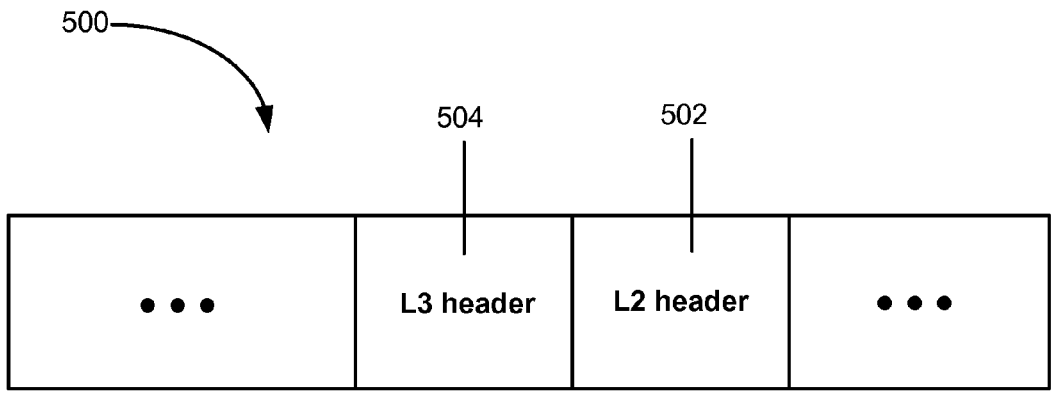
FIG. 5A illustrates an exemplary packet that may arrive at a PE router of FIG. 1.
Figure 5B:
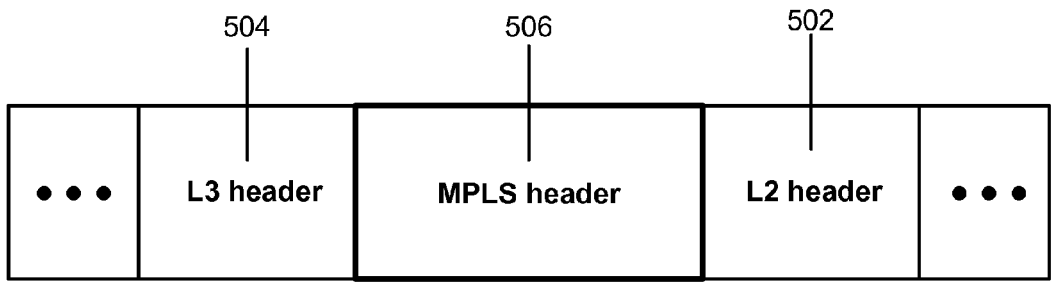
FIG. 5B illustrates an exemplary packet with a MPLS header inserted between the two headers of FIG. 5A.

FIG. 5A illustrates an exemplary packet 500 that may arrive at PE router 116. As illustrated, packet 500 may include a L2 header 502 (i.e., OSI level 2 packet header) and a L3 header 504 (i.e., OSI level 3 packet header). Upon receiving packet 500, MPLS logic 402 may categorize packet 500 into a class, may determine the next destination of packet 500 based on the classification, LFIB 404, and/or LIB 406. In addition, MPLS logic 402 may insert a MPLS header 506 between L2 header 502 and L3 header 504, as illustrated in FIG. 5B, and may transmit packet 500 at output line card 208 (FIG. 2). At PE router 118, if packet 500, as shown in FIG. 5B, arrives to exit IP/MPLS network 106, MPLS logic 402 may strip MPLS header 506 to recover packet 500 as shown in FIG. 5A and may send packet 500 to network 104.

If the host router operates as PS router 120, MPLS logic 402 may perform an operation on MPLS header 506 of a received packet and may send (i.e., route) the packet based on MPLS header 506. The operation may include creating another MPLS header and inserting it next to MPLS header 506, swapping MPLS header 506 for another MPLS header, and/or removing MPLS header 506.

Figure 5C:
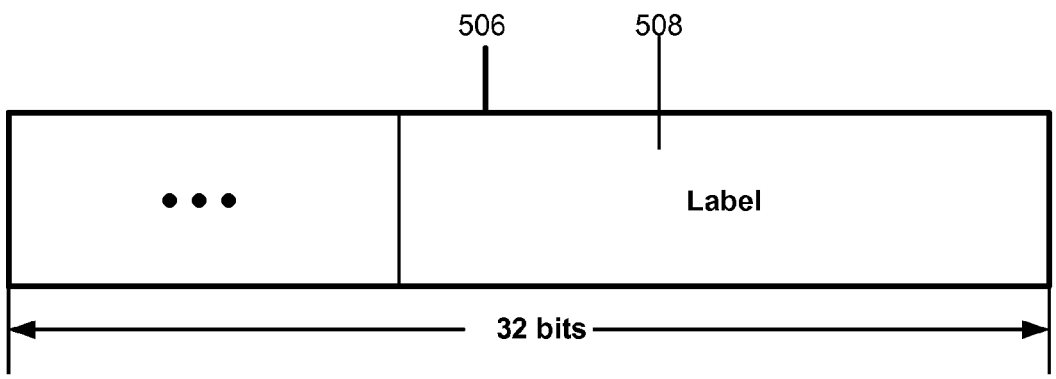
FIG. 5C illustrates an exemplary structure of the MPLS header of FIG. 5B.

FIG. 5C illustrates the structure of MPLS header 506, which may include a label 508. In PS router 120, label 508 may be used by MPLS logic 402 as an index into LFIB 404 or LIB 406 to determine the operation (i.e., creating and inserting a MPLS header, swapping a MPLS header with another, or removing a MPLS header) and the next destination. Because many operations may be performed on a packet during its transit through network 106 (e.g., at a particular PS router 120 or 122), it may be possible for the packet to have more than one MPLS header 506. However, if the packet leaves network 106, it may have shed MPLS headers that have been inserted since its entry into network 106.

Figure 6:
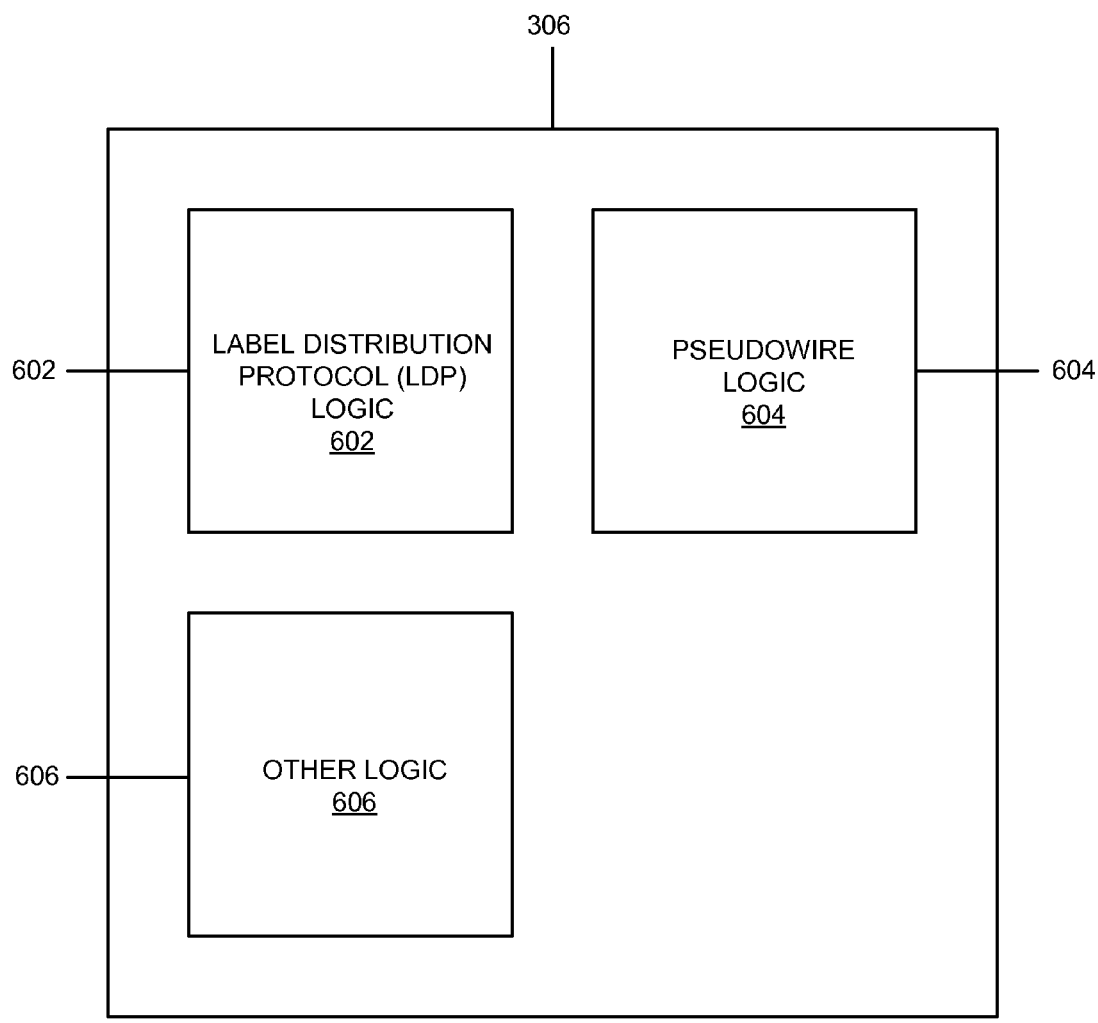
FIG. 6 shows an exemplary functional block diagram of the routing logic of FIG. 3.

FIG. 6 shows an exemplary functional block diagram of routing logic 306. As shown, routing logic 306 may include label distribution protocol (LDP) logic 602, pseudowire logic 604, and other logics 606.

LDP logic 602 may include hardware and/or software for sharing labels with other PE and PS routers that include LDP logic. Pseudowire logic 604 may include hardware and/or software for establishing pseudowires, as described below in more detail. Other logic 606 may include hardware and/or software for implementing other capabilities associated with routing logic 306, such as quality-of-service packet delivery.

LDP logic 602 may enforce a specific set of procedures (i.e., LDP protocol) for exchanging messages (e.g., LDP messages) about labels. Through the exchange of LDP messages, a LIB of each router in network 106 may be populated with routing and label information by which participating PE and PS routers may abide.

Briefly, LDP messages may include information about forwarding equivalence classes (FECs) and a label associated (i.e., bound) with each FEC. At PE router 116, for example, each FEC may represent a class into which a packet from an outside network may be categorized. By classifying packets into FECs and dispatching the packets based on labels associated with FECs, IP/MPLS network 106 may provide routing services that are scaleable with increasing packet traffic.

If LDP logic 602 in PE router 116 populates its LIB 406 with FEC and label information that is propagated from PE router 118, a Label Switched Path (LSP) from PE router 116 to PE router 118 may be determined for packets that arrive at PE router 116 from attachment circuit 108. Similarly, if LDP logic 602 in PE router 118 populates its LIB 406 with FEC and label information from PE router 116, a LSP from PE router 118 to PE router 116 may be determined for packets that arrive at PE router 118 from attachment circuit 110. Each of the two LSPs between PE router 116 and PE router 118 may operate as a MPLS tunnel (e.g., a path in which a number of MPLS headers in a packet may be the same at the path's entry point and its exit point).

Returning to FIG. 6, pseudowire logic 604 may invoke LDP logic 602 if routing logic 306 receives or sends information related to FECs and/or labels for legacy network packets. More specifically, pseudowire logic 604 may create or exchange LDP messages about FECs that are associated with the legacy network packets and/or labels that are bound to the FECs. As a consequence of exchanging the LDP messages, pseudowire logic 604 may establish two LSPs over the MPLS tunnels described above. The two LSPs may form a bidirectional pseudowire, in which each LSP may be unidirectional and may run in a direction opposite to that of the other LSP.

Figure 7:
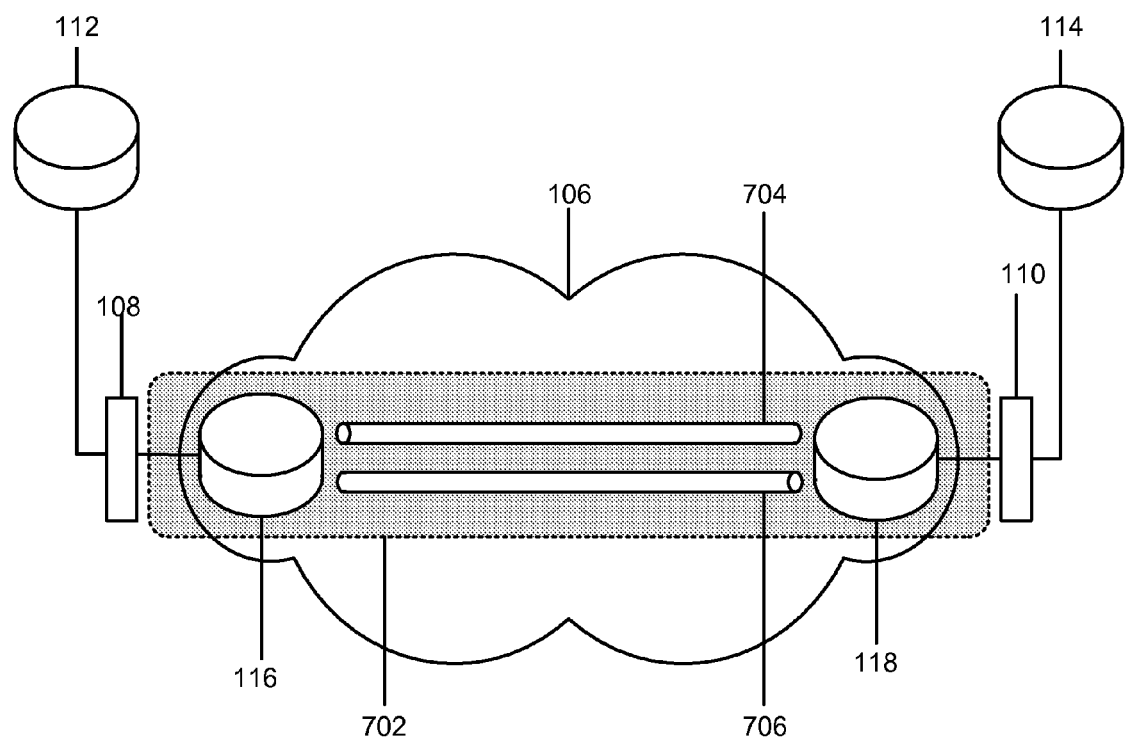
FIG. 7 depicts an exemplary representation of a pseudowire and some of the components of FIG. 1.

FIG. 7 depicts an exemplary representation of a pseudowire 702 and some of the components of FIG. 1. As illustrated in FIG. 7, pseudowire 702 may extend from attachment circuit 108 to attachment circuit 110 and may depend on underlying MPLS tunnels 704 and 706 that extend between PE routers 116/118. If established, pseudowire 702 may transport a packet that flows into PE router 116 from attachment circuit 108.

If the packet arrives at PE router 116, PE router 116 may encapsulate (i.e., convert) the packet into a pseudowire packet by adding a pseudowire header to the packet. PE router 116 may encapsulate the packet as a MPLS packet, by adding a MPLS header, and may route the packet toward its destination through MPLS tunnel 704. If the packet emerges from MPLS tunnel 704 at PE router 118, PE router 118 may decapsulate (i.e., convert back) the packet by removing the MPLS header and the pseudowire header. Based on the information contained within the pseudowire header, the packet may or may not be transmitted to attachment circuit 110.

Figure 8:
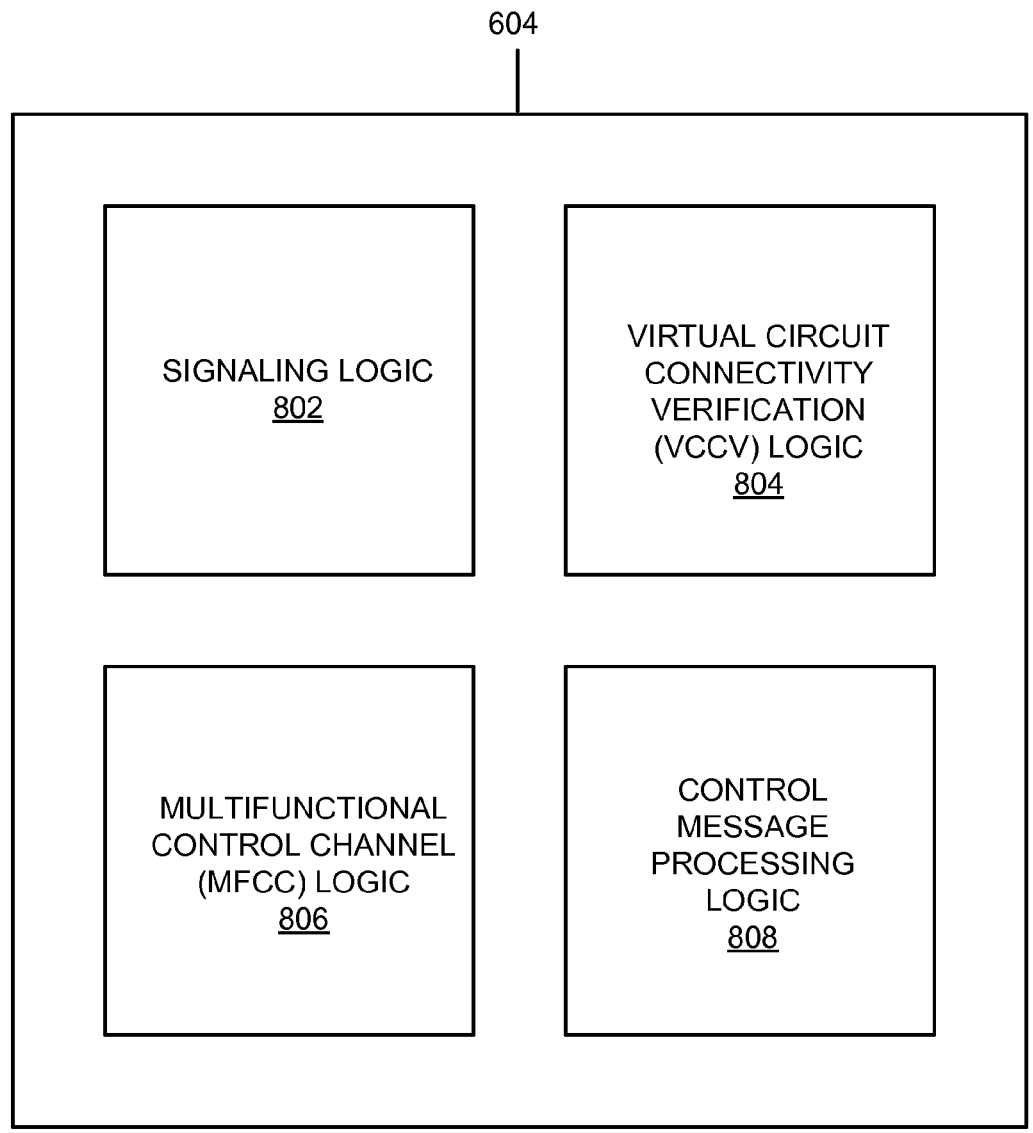
FIG. 8 shows an exemplary functional block diagram of the pseudowire logic of FIG. 6.

FIG. 8 depicts an exemplary functional block diagram of pseudowire logic 604. As shown, pseudowire logic 604 may include signaling logic 802, Virtual Connectivity Verification (VCCV) logic 804, Multifunctional Control Channel (MFCC) logic 806, and/or Control Message Processing logic 808. Signaling logic 802 may include hardware and/or software for establishing and maintaining pseudowires by exchanging LDP messages through the use of LDP logic 602 and control messages, as described below. VCCV logic 804 may include hardware and/or software for creating and using a control channel associated with a pseudowire. MFCC logic 806 may include hardware and/or software for creating and using a multifunctional control channel associated with a pseudowire. Control Message Processing logic 808 may include hardware and/or software for sending control messages and for processing control messages that may be received over pseudowires. In PE routers 116 and 118, Control Message Processing logic 808 may prevent the control messages from being routed to devices outside IP/MPLS network 106.

Signaling logic 802 may permit identification of pseudowires and may signal attributes of pseudowires by performing many of functions performed by pseudowire logic 604. The functions may include, for example, exchanging, with PS and PE routers 116-122, LDP messages which describe FECs that are associated with the legacy network packets and labels that are bound to the FECs.

Figure 9A:
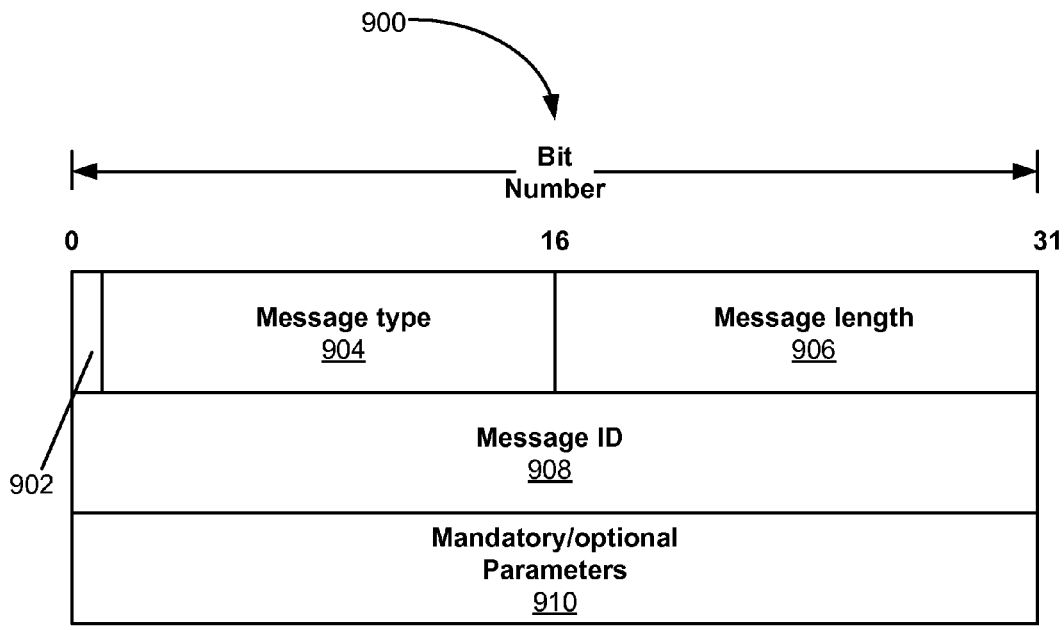
FIG. 9A shows an exemplary format of a Label Distribution Protocol (LDP) message.

FIG. 9A shows an exemplary format of a LDP message 900 that may be generated by signaling logic 802. In general, a LDP header (not shown) may precede one or more LDP messages 900, and each LDP message 900 may take the type-length-value (TLV) format. As shown in FIG. 9A, LDP message 900 may include a variety of fields, such as an Unknown field 902, a Message Type field 904, a Message Length field 906, a Message ID field 908, and a Mandatory/Optional Parameters field 910. Unknown field 902 may specify whether a reply to LDP message 900 is to be returned if LDP message 900 is of an unknown type. For example, if Unknown field 902 is "1," LDP message 900 may be ignored if a value in Message Type field 904 is not recognized at the receiving router. Message Type field 904 may indicate a LDP message type (e.g., a Keep Alive message, an Address message, a Label Mapping Message, etc.). Message length field 906 may indicate the cumulative length, in octets, of Message ID 908 field and Mandatory/Optional Parameters field 910. Message ID field 908 may contain a value used to identify LDP message 900. Mandatory/Optional Parameters field 910 may include parameters that may be required and/or are optional for a particular Message Type 904 value.

Figure 9B:
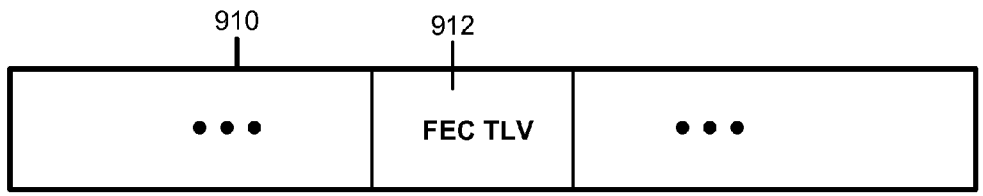
FIG. 9B depicts an exemplary format for the Mandatory/Optional Parameters field of FIG. 9A.
Figure 9C:
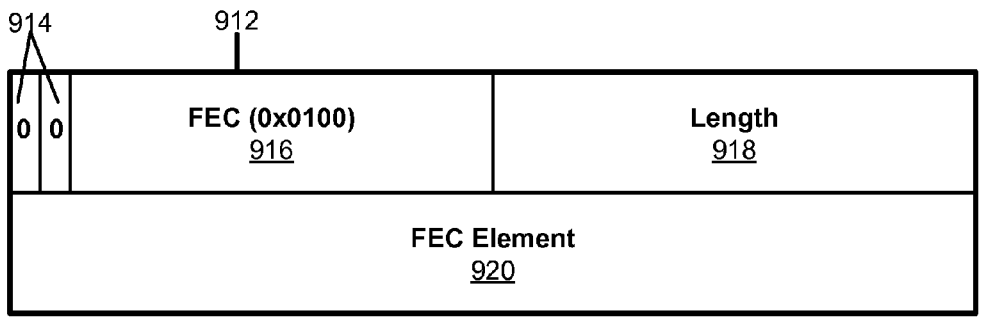
FIG. 9C shows an exemplary format for the forwarding equivalence class (FEC) type-length-value (TLV) of FIG. 9B.

FIG. 9B shows an exemplary format for Mandatory/Optional Parameters field 910. As shown, Mandatory Parameters field 910 may include a FEC-TLV field 912, which may provide a list of packet classes (i.e., FECs). FIG. 9C shows an exemplary format for FEC-TLV field 912. FEC-TLV field 912 may include a variety of fields (e.g., a Zero-flag field 914, a FEC field 916, a Length field 918, a FEC element field 920, etc.). Zero-flag field 914 and FEC field 916 may be set to constants (e.g., "0" and "0x000," respectively). Length field 918 may include a value for the length of FEC Element field 920.

Figure 10A:
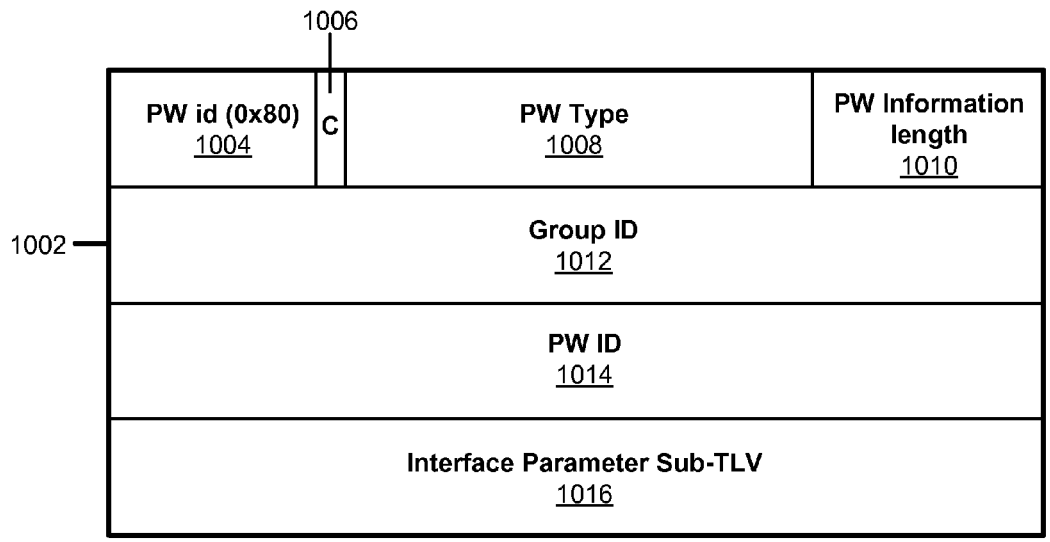
FIGS. 10A and 10B show exemplary structures of a pseudowire (PW) ID FEC Element and a Generalized PW ID FEC Element, respectively.
Figure 10B:
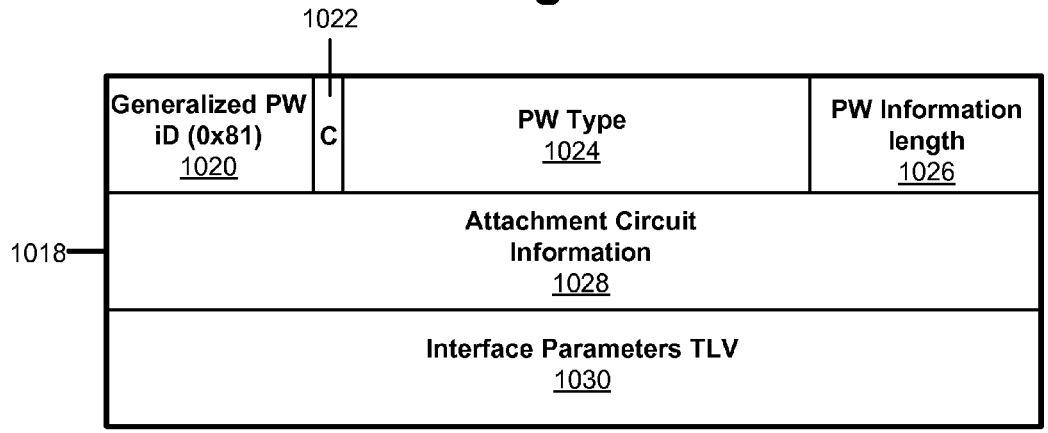

For pseudowires, FEC Element field 920 may include, for example, a PW ID FEC Element, a Generalized PW ID FEC Element, etc. FIGS. 10A and 10B show the exemplary structures of a PW ID FEC Element 1002 and a Generalized PW ID FEC Element 1018, respectively.

As shown in FIG. 10A, PW ID FEC Element 1002 may include a PW id 1004, a C element 1006, a PW Type 1008, a PW Info Length 1010, a Group ID 1012, a PW ID 1014, and/or an Interface Parameter Sub-TLV 1016. PW id 1004 may identify PW ID FEC Element 1002 and may be set to a constant value (e.g., "0x80"). C element 1006 may specify whether a control word is present for control messages that may be conveyed over the pseudowire associated with the PW ID FEC Element 1002. For a pseudowire with a Multifunctional Control Channel (MFCC), C element 1006 may be set to a value (e.g., "1"), to indicate the presence of a control word in MFCC control messages.

PW Type 1008 may represent the type of pseudowire. Examples of PW Type 1008 may include "0x0001" for Frame Relay, "0x0003" for ATM transparent cell transport, "0x0005" for Ethernet, etc. PW Info Length 1010 may specify the cumulative length of PW ID 1014 and Interface Parameter Sub-TLV 1016. Group ID 1012 may specify an arbitrary 32-bit value that represents a group of pseudowires. PW ID 1014 may identify a particular pseudowire. Interface Parameter Sub-TLV 1016 may be used to provide interface-specific information, such as attachment circuit (e.g., attachment circuits 108 and 110) characteristics.

As shown in FIG. 10B, Generalized PW ID FEC Element 1018 may include a Generalized PW id 1020, a C element 1022, a PW Type 1024, a PW Info Length 1026, Attachment Circuit (AC) information 1028, and/or an Interface Parameter TLV 1030. Generalized PW id 1020 may identify Generalized PW ID FEC Element 1018 and may be set to a constant value (e.g., "0x81"). C element 1022 and PW Type 1024 may specify the same information as C element 1006 and PW Type 1008, as described above. PW Info Length 1026 may specify the length of Attachment Circuit (AC) Information 1028. Attachment Circuit Information 1028 may specify address information related to local and remote attachment circuits, such as attachment circuits 108 and 110. Interface Parameters TLV 1030 may be used to provide interface-specific parameters, similar to Interface Parameter Sub-TLV 1016.

Figure 10C:
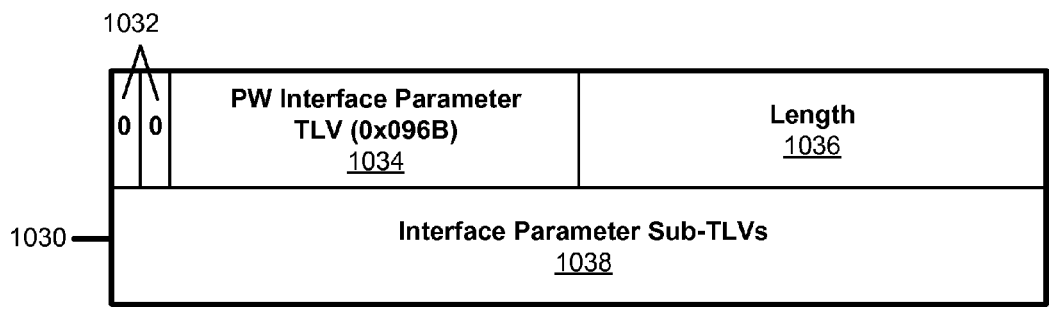
FIG. 10C shows an exemplary structure of the Interface Parameters TLV of FIG. 10B.

FIG. 10C shows an exemplary structure of Interface Parameters TLV 1030. As shown, Interface Parameters TLV 1030 may include zero fields 1032, a PW Interface Parameter TLV 1034, a length 1036, and/or Interface Parameter Sub-TLVs 1038. Zero fields 1032 and PW Interface Parameter TLV 1034 may be set to constants (e.g., "0x00" and "0x096B," respectively). Length 1036 may specify the length of Interface Parameter Sub-TLVs 1038. Each of Interface Parameter Sub-TLVs 1038 may be used for the similar purpose as described above for Interface parameter Sub-TLV 1016.

Returning to FIG. 8, VCCV logic 804 may establish a control channel, by placing a VCCV Parameter field as Interface Parameter Sub-TLV 1016 (FIG. 10A) in PW ID FEC element 1002 and/or in Interface Parameter Sub-TLVs 1038 (FIG. 10C) if signaling logic 802 exchanges LDP messages with its peers.

Figure 11A:
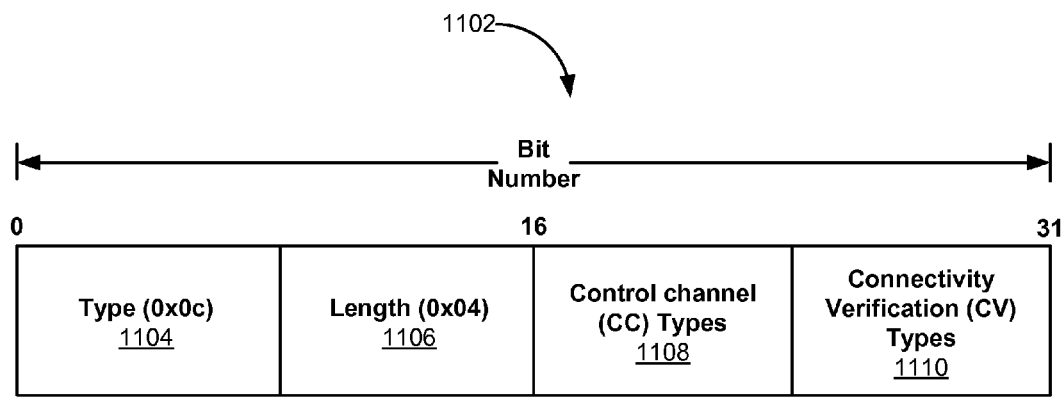
FIG. 11A illustrates exemplary Virtual Circuit Control Verification (VCCV) Parameter field in LDP messages for establishing a pseudowire.

FIG. 11A illustrates an exemplary format of a VCCV Parameter field 1102. As shown, VCCV Parameter field 1102 may include a Type 1104, a Length 1106, Control channel (CC) Types 1108, and Connectivity Verification (CV) Types 1110. Type 1104 may identify VCCV Parameter field 1102 and may be set to an octet value (e.g., "0x0c"). Length 1106 may provide a length (e.g., four bytes) of VCCV Parameter field 1102 and may be set to a constant value (e.g., "0x04").

CC Types 1108 may carry an eight-bit field to indicate the type of control channel(s) by which a router is capable of receiving control traffic. Of the eight bits in CC Types 1008 field, each of bits "0-2" may be used to designate one of three control channel types (e.g., as assigned by the Internet Assigned Numbers Authority (IANA)). CV Types 1110 may include a bit field to indicate the type of control messages for verifying connectivity between pseudowire endpoints. For example, CV Types 1110 may indicate that control messages may be a LSP Ping (i.e., an echo request through LSP) or a bidirectional forwarding detection (BFD) signal, which may refer to messages used for continuous monitoring of a route or a data path for faults in both forward and reverse directions.

Returning to FIG. 8, if a pseudowire and an associated control channel are constructed, VCCV logic 804 may send and/or receive control messages through the control channel. The control channel may carry one of the message types indicated in CV Types 1110 of VCCV Parameter field 1102 throughout the life of the control channel. If transmitting control messages, VCCV logic 804 may generate a tag, known as a control word, to distinguish the control messages from other pseudowire packets if an in-band control channel is designated by CC Types 1108 field during the control channel setup.

Figure 11B:
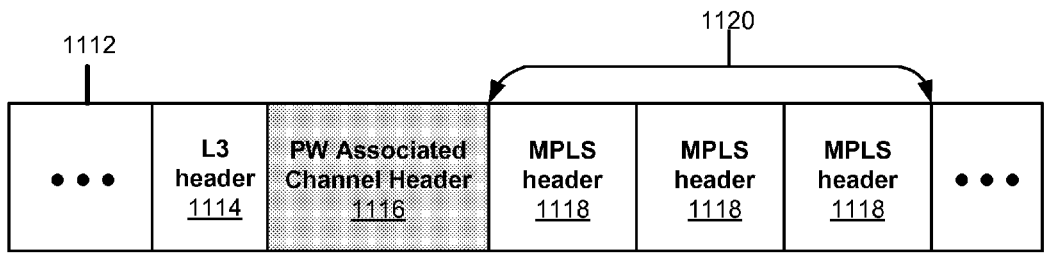
FIG. 11B shows an exemplary placement of a control word in a control message.
Figure 11C:
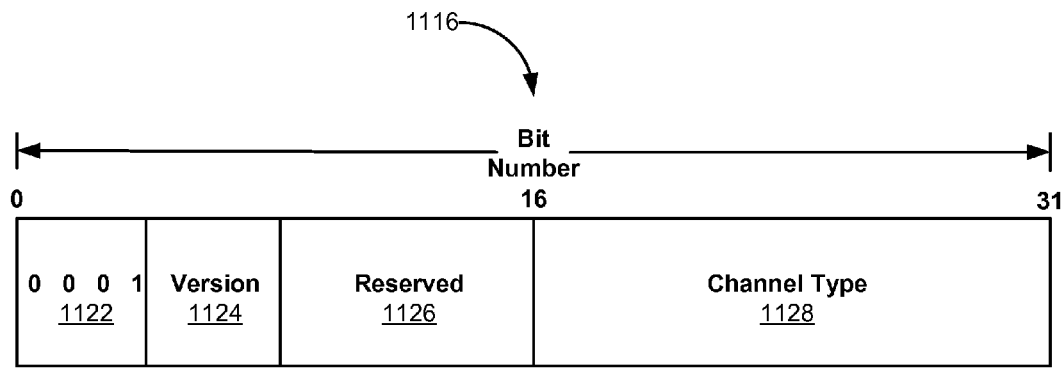
FIG. 11C shows an exemplary structure of the PW Associated Channel Header of FIG. 11B.

FIG. 11B shows an exemplary placement of a control word in a control message 1112. As shown, the control word may be a PW Associated Channel Header 1116 and may be located between a MPLS label stack 1120, which includes MPLS headers 1118, and a L3 header 1114. FIG. 11C shows an exemplary structure of PW Associated Channel Header 1116. As shown, PW Associated Channel Header 1116 may include a Nibble 1122, a Version 1124, a Reserved 1126, and a Channel Type 1128. Nibble 1122 may indicate a channel associated with a pseudowire and may be set to a value (e.g., "0x01"). Version 1124 and Reserved 1126 may be constants and may be set to a value (e.g., "0"). Channel Type 1128 may be one of three values (e.g., "0x0021" to indicate Internet Protocol Version 4 (IPv4), "0x0056" for Internet Protocol Version 6 (IPv6), or "0x0006" for BFD channels that carry packets without Internet Protocol (IP)/User Datagram Protocol (UDP) header).

Returning to FIG. 8, MFCC logic 806 may set a multifunctional control channel, by writing VCCV Parameter field 1102 (FIG. 11A) as Interface Parameter Sub-TLV 1016 (FIG. 10A) in PW ID FEC Element 1002 (FIG. 10A) and/or in Interface Parameter Sub-TLVs 1038 (FIG. 10C) if signaling logic 802 exchanges LDP messages with its peers. VCCV Parameter field 1102 written by MFCC logic 806 may have a similar format as VCCV Parameter field 1102 written by VCCV logic 804, except that CC Types 1108 may carry a code to signal the MFCC (e.g., bit "3" in bits "3-7"). The MFCC code may be registered, like bits "0-2" in CC Types 1108, with the IANA, or may not be registered with the IANA.

If a pseudowire and an associated MFCC are constructed, MFCC logic 806 may use the MFCC by sending and/or receiving control messages over the MFCC. MFCC control channel may carry one or more of the message types indicated in CV Types 1110 of VCCV Parameter field 1102 throughout the life of the MFCC control channel.

MFCC control messages may carry a PW Associated Channel Header as its control word. In contrast to Channel Type 1128 of PW Associated Channel Header 1116 for VCCV control messages, Channel Type 1128 of PW Associated Channel Header 1116 for MFCC control message may include a value that reflects one of the functions represented by CV Types 1110 that have been specified during the MFCC setup.

Figure 12:
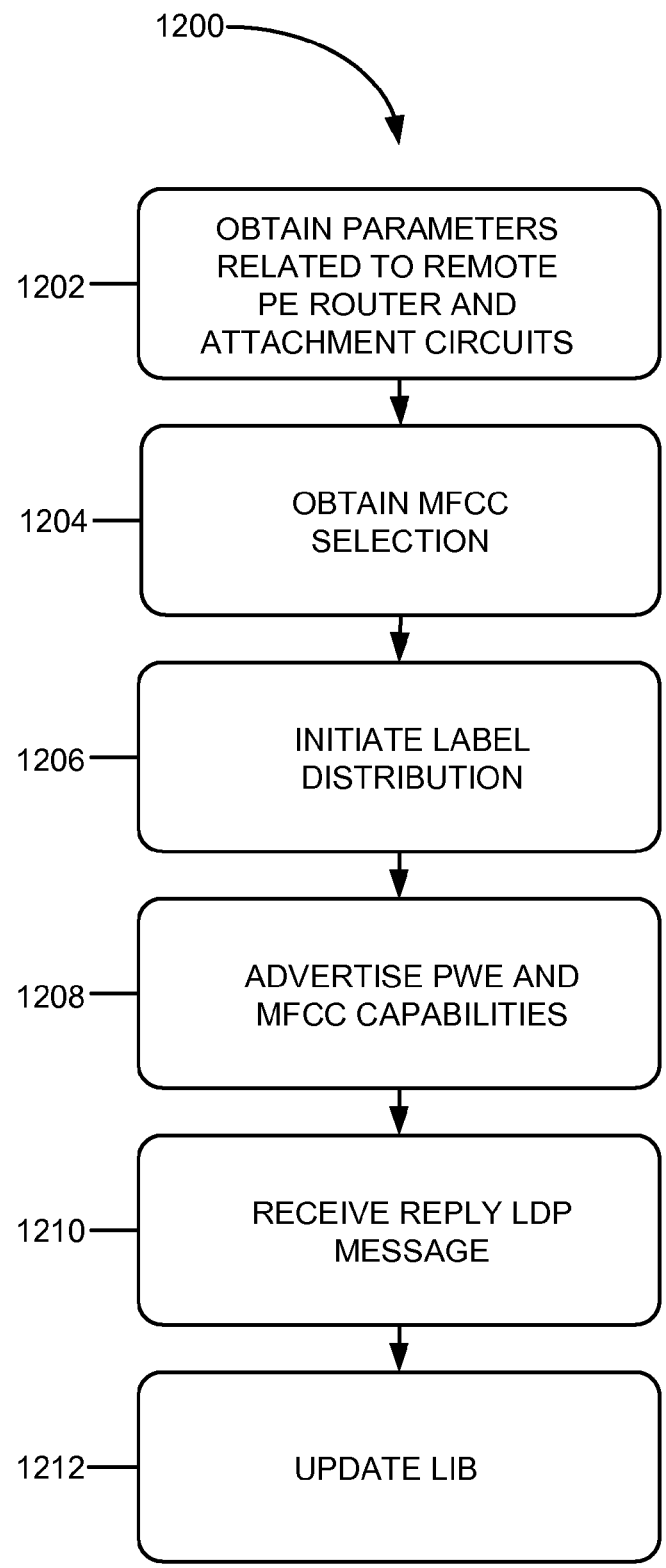
FIG. 12 shows an exemplary process for establishing a multifunctional control channel for pseudowire (PW) emulation.
Figure 13:
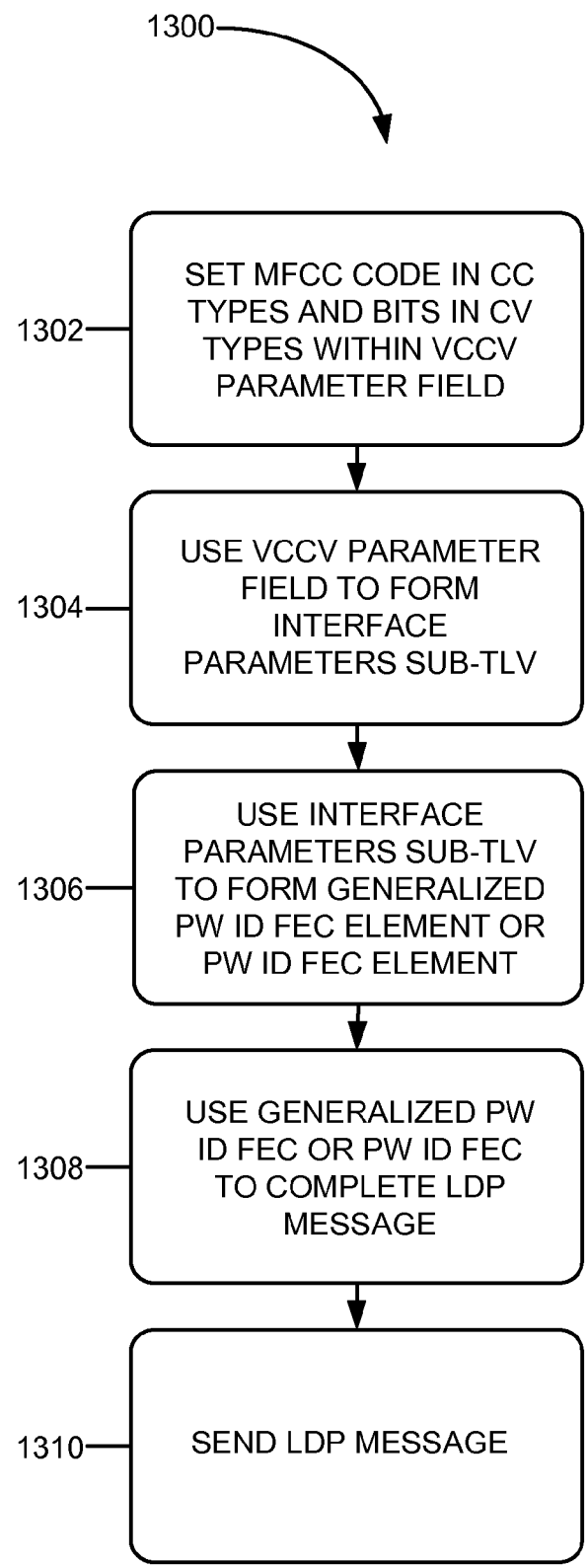
FIG. 13 shows an exemplary process for writing a LDP message which may convey PWE and Multifunctional Control Channel (MFCC) capabilities from one PE router to another PE router.
Figure 14:
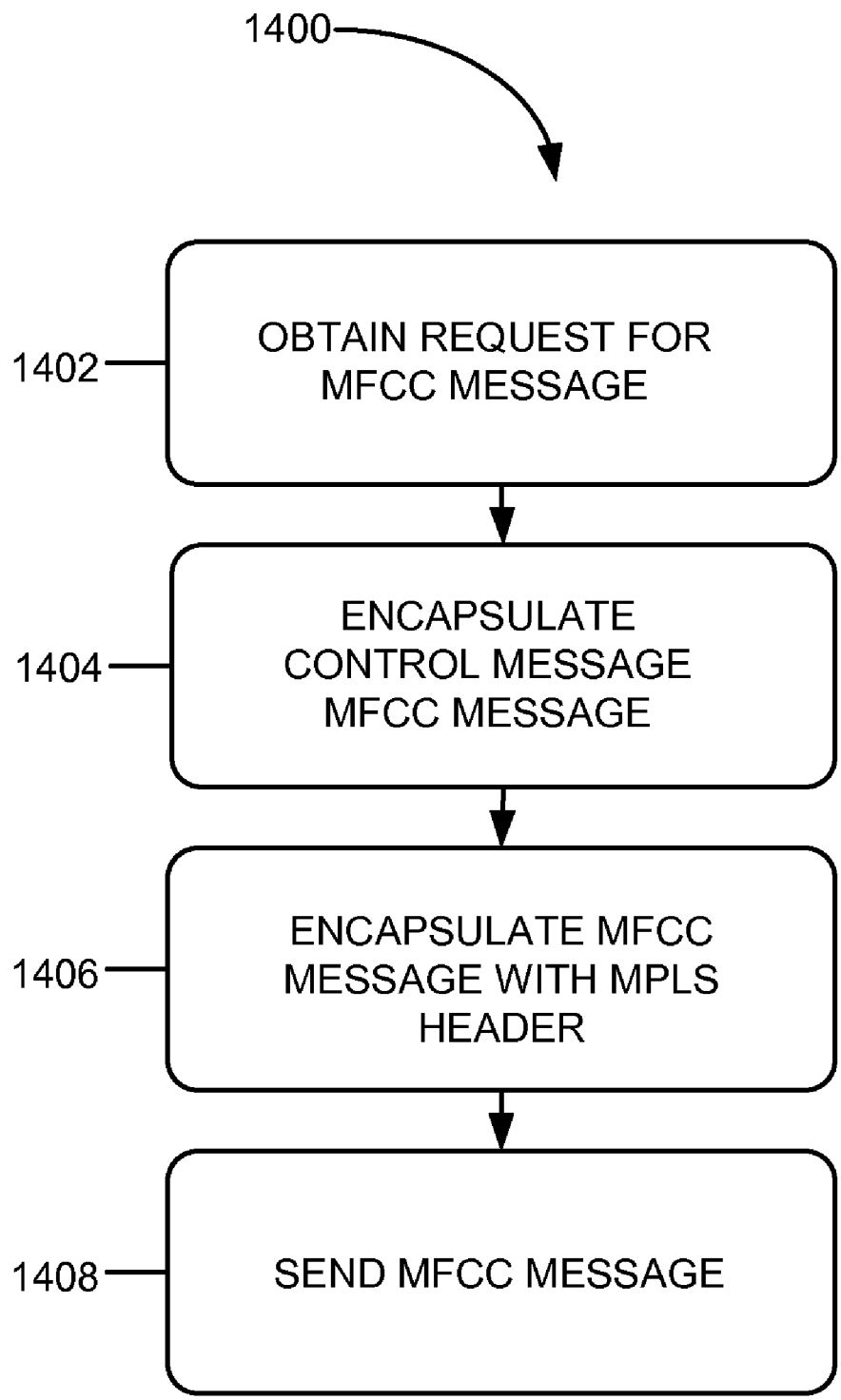
FIG. 14 illustrates an exemplary process for exchanging MFCC messages using an MFCC.

Implementations described above provide an exemplary multifunctional control channel system for a pseudowire, including the system elements, such as PE/PS routers 116-122, forwarding logic 304, routing logic 306, pseudowire logic 604, signaling logic 802, VCCV logic 804, and MFCC logic 806, as well as associated message structures and formats. FIGS. 12-14 depict exemplary processes capable of being performed by one or more of the system elements.

FIG. 12 shows an exemplary process 1200 for establishing a MFCC for a pseudowire. Process 1200 may begin by obtaining parameters related to a remote PE router (e.g. PE router 118) and attachment circuits (e.g., attachment circuits 108 and 110) (block 1202). In one implementation, the parameters may be obtained from a network administrator or a user. In another implementation, the parameters may be obtained through a dynamic auto-discovery procedure.

A MFCC selection may be obtained (block 1204). In one implementation, the obtained selection may be made by a user, an administrator, and/or by another device. In other implementations, a MFCC may be selected as a default control channel for any pseudowire that may be established.

As further shown in FIG. 12, label distribution may be initiated (block 1206). In one implementation, for example, initiating the label distribution may include opening and closing LDP sessions, sending Hello message, performing other LDP initialization procedures, etc. The label distribution may include a Downstream Unsolicited Mode and Liberal Label Retention Mode. In the Downstream Unsolicited Mode, labels and FECs associated with the labels may be transmitted from a router to downstream routers without demands from the downstream routers. In the Label Retention Mode, information about a FEC and a label associated with the FEC may be retained by a receiving router independent of a hop distance between the originating router and the receiving router.

Process 1200 may include advertising PWE and MFCC capabilities (block 1208). In one implementation, to advertise PWE and MFCC, a LDP Message, such as a Label Mapping Message, may be written and sent from the PE router that initiates the PWE. FIG. 13 shows an exemplary process 1300 for writing a LDP message that conveys PWE and MFCC capabilities from one PE router to another PE router.

As shown in FIG. 13, process 1300 may include setting a MFCC code in CC Types 1108 and bits in CV Types 1110 within VCCV Parameter 1102 field to a value (e.g., "1") (block 1302). In one implementation, for example, the MFCC code in CC Types 1108 may indicate that the transmitting PE router supports MFCC. The bits in CV Types 1110 may indicate the types of control messages that may be conveyed over a pseudowire.

VCCV Parameter field 1102 may be used to form Interface Parameters Sub-TLV 1038 (block 1304). Interface Parameters Sub-TLV 1038 may be used to form Generalized PW ID FEC Element 1018 or PW ID FEC Element 1002 (block 1306). In one implementation, in forming Generalized PW ID FEC Element 1018, information about attachment circuits, obtained at block 1202, may be incorporated as Attachment Circuit Information 1028.

As further shown in FIG. 13, Generalized PW ID FEC 1018 or PW ID FEC 1002 may be used to complete an LDP message (block 1308). For example, in one implementation, Generalized PW ID FEC 1018 or PW ID FEC 1002 may be used to complete a LDP message as described above in connection with FIGS. 9A-9C. Process 1300 may include sending the LDP message (block 1310). A LDP message that may be sent may include, for example, a Notification Message, a Label Request Message, a Label Release Message, a Label Mapping Message, etc.

Returning to FIG. 12, process 1200 may include receiving a reply LDP message (block 1210). In one implementation, the reply LDP message may originate from the PE router to which the original Label Mapping Message is sent. The reply LDP message may be a Label Release Message if the PE router at the other end of a pseudowire is unable to verify the information contained in the Label Mapping message. Otherwise, the reply LDP message may be another Label Mapping Message, which may inform the PE router initiating the PWE. If the LDP message is a Label Mapping Message, CV Types 1110 field may contain bits that reflect a subset of selected functions that are advertised in CV Types 1110 field of the original Label Mapping Message.

Process 1200 may include finalizing the label distribution (block 1212). In one implementation, the finalization may involve opening and closing a LDP session, sending additional LDP messages, etc., in accordance with LDP. If the PE routers finish exchanging Label Mapping Messages and update their LIBs, two unidirectional LSPs that transport messages in opposite directions may be available as a bidirectional pseudowire. The PE routers may exchange MFCC control messages over the pseudowire.

FIG. 14 illustrates an exemplary process 1400 for exchanging MFCC messages using an MFCC. As shown, process 1400 may begin with the obtaining of a request for MFCC message (block 1402). In one implementation, the request may originate from a user and/or an administrator at a PE router or from a remote device, or from a legacy network device.

A control message may be encapsulated as an MFCC message (block 1404). For example, in one implementation, the encapsulation may be performed by adding a PW header (i.e., an MPLS header that indicates PW) and by inserting a control word (i.e., PW Associated Channel Header 1116). The control word may contain Channel Type 1128 that reflects the selected function among those represented by CV Types 1108 in the reply Label Mapping Message during the MFCC setup.

As further shown in FIG. 14, the MFCC message may be encapsulated with an MPLS header (block 1406) and the encapsulated MFCC message may be sent (block 1408). In one implementation, the encapsulated MFCC message may arrive at the destination PE router, and if necessary, the destination PE router may respond with a reply message.

The exemplary processes, described above in connection with FIGS. 12-14, for establishing and using a MFCC may be further illustrated through the following example, in conjunction with implementations described above in connection with FIGS. 1, 7, 9A-9C, 10A-10C, and 11A-11C. Assume that two legacy networks 102 and 104 are Ethernet networks capable of establishing a communication channel through PE routers 116 and 118 in IP/MPLS network 106. In addition, assume that PE routers 116 and 118 are capable of employing a pseudowire as their communication medium.

At PE router 116, parameters related to remote PE router 118 and its attachment circuit 110 may be obtained through an auto-discovery procedure. In addition, PE router 116 may obtain a MFCC as the type of control channel that is to be used for managing and testing the pseudowire.

If PE router 116 obtains the parameters, PE router 116 may initiate label distribution, may begin a LDP session with an adjacent PS router 120, and may send a Label Mapping Message. The Label Mapping Message may contain information in the format illustrated in FIGS. 9A-9C, 10A-10C and 11A. PS router 120, in turn, may forward the Label Mapping Message to another PS router. The PS routers in IP/MPLS network 106 may continue to propagate the Label Mapping Message until PE router 118 receives the Label Mapping Message.

If PE router 118 receives the Label Mapping Message, PE router 118 may verify the contents of the Label Mapping Message. Upon successful verification, PE router 118 may update its LIB and may send its own Label Mapping Message as a reply. The reply may contain CC Types 1108 value in the Label Mapping Message from PE router 116. CV Types 1110 value may reflect supported control message types among those presented by CV Types 1110 field in the Label Mapping Message from PE router 116. If the verification is not successful, PE router 118 may send a Label Release Message. Upon receiving the reply from PE router 118, PE router 116 may update its own LIB. Through the preceding exchange of Label Mapping Messages, a bidirectional pseudowire may be established.

With a pseudowire in place, PE router 116 may receive a request from a network administrator to send a MFCC message to PE router 118. PE router 116 may write its control message, and may encapsulate the message as a MFCC message. The encapsulation may involve inserting a control word (e.g., setting Channel Types 1128 with a selected control message type from among those in CV Types 1110 in the reply Label Mapping Message) and appending a PW header. The encapsulated message may be encapsulated with a MPLS header. PE router 116 may send the resulting MPLS message to PE router 118.

The above example illustrates how a MFCC may be established and used for sending control messages through pseudowires. Unlike VCCV control channels, a pseudowire does not need to be re-established if a different type of control message is sent over the MFCC to a destination device. By eliminating the need to re-establish pseudowires through LDP message exchanges, the MFCC may increase available service time, flexibility, and reliability of an IP/MPLS network.

The foregoing description of implementations provides illustration, but is not intended to be exhaustive or to limit the implementations to the precise form disclosed. Modifications and variations are possible in light of the above teachings or may be acquired from practice of the teachings.

For example, while FIG. 8 shows signaling logic 802, VCCV logic 804, and MFCC logic 806 in pseudowire logic 604, in other implementations, signaling logic 802, VCCV logic 804, and MFCC logic 806 may have different functional hierarchy. For example, signaling logic 802 may include VCCV logic 804 and VCCV logic 804 may, in turn, include MFCC logic 806.

In another example, while series of acts have been described with regard to processes illustrated in FIGS. 12-14, the order of the acts may be modified in other implementations. For example, block 1204 may be performed before block 1202 and/or blocks 1302-1320 may be performed before block 1206. Further, non-dependent acts may represent acts that can be performed in parallel. For example, blocks 1202, 1204, and 1206 may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    advertising a multifunctional control channel in an interface parameter sub-type-length-value of an advertisement label mapping message that is dispatched to a network device;
    processing a reply label mapping message that is transmitted from the network device in response to the advertisement label mapping message; and
    updating a label information base to establish a pseudowire associated with the multifunctional control channel, wherein advertising a multifunctional control channel in an interface parameter sub-type-length-value includes:
    setting a multifunctional control channel code in a control channel types field within a virtual circuit connectivity verification parameter field in the advertisement label mapping message to indicate multifunctional control channel capability to the network device; and
    dispatching the advertisement label mapping message to the network device.

2. The method of claim 1, further comprising:
    using the multifunctional control channel to send different types of control messages without tearing down the pseudowire.

3. The method of claim 1, wherein setting a multifunctional control channel code in a control channel types field includes:
    setting the control channel types field to predetermined values.

4. A method comprising:
    advertising a multifunctional control channel in an interface parameter sub-type-length-value of an advertisement label mapping message that is dispatched to a network device;
    processing a reply label mapping message that is transmitted from the network device in response to the advertisement label mapping message; and
    updating a label information base to establish a pseudowire associated with the multifunctional control channel, wherein advertising a multifunctional control channel in an interface parameter sub-type-length-value includes:
    setting a connectivity verification types field bits within a virtual circuit connectivity verification parameter field in the advertisement label mapping message to indicate types of control messages that may be sent through the multifunctional control channel; and
    dispatching the advertisement label mapping message to the network device.

5. The method of claim 4, further comprising:
    forming a control message; and
    sending the control message over the multifunctional control channel.

6. The method of claim 5, wherein forming a control message includes:
    setting a channel type field in a control word so that bits in the channel type field contain one or more bit values of a connectivity verification types field in the reply label mapping message; and
    inserting the control word at a bottom of an multi-protocol label switching label stack in the control message.

7. The method as in claim 6, further comprising:
    creating a control message; and
    sending the control message over the multifunctional control channel.

8. The method of claim 6, wherein dispatching the advertisement label mapping message includes:
    notifying the network device of multifunctional control channel functions that the network device can choose to support.

9. The method of claim 6, wherein processing a reply label mapping message includes:
    receiving the reply label mapping message; and
    verifying an ability of the network device to support the multifunctional control channel by examining the interface parameter sub-type-length-value of the reply label mapping message.

10. A method comprising:
    advertising a multifunctional control channel in an interface parameter sub-type-length-value of an advertisement label mapping message that is dispatched to a network device;
    processing a reply label mapping message that is transmitted from the network device in response to the advertisement label mapping message;
    updating a label information base to establish a pseudowire associated with the multifunctional control channel;
    obtaining information about a local attachment circuit and a remote attachment circuit connected to the network device; and
    incorporating the information about the local attachment circuit and the remote attachment circuit into the advertisement label mapping message.

11. A method comprising:
advertising a multifunctional control channel in an interface parameter sub-type-length-value of an advertisement label mapping message that is dispatched to a network device;
processing a reply label mapping message that is transmitted from the network device in response to the advertisement label mapping message;
updating a label information base to establish a pseudowire associated with the multifunctional control channel, wherein processing a reply label mapping message includes:
receiving the reply label mapping message; and
registering different types of control messages that the network device supports, based on a value of a connectivity verification types field in the interface parameter sub-type-length-value of the reply label mapping message.

12. A device comprising:
a processor to:
create an advertisement,
set a multifunctional control channel code in a control channel types field within a virtual circuit connectivity verification parameter field in the advertisement to indicate multifunctional control channel capability,
send the advertisement to a network device,
receive a response from the network device,
establish a pseudowire and a multifunctional control channel associated with the pseudowire between the device and the network device based on the response,
send control messages over the multifunctional control channel, and
exchange label distribution protocol messages to indicate a status of the pseudowire or to tear down the pseudowire.

13. The device of claim 12, wherein one of the label distribution protocol messages includes:
at least one of a pseudowire ID forward equivalence class type-length-value element or a generalized pseudowire ID forwarding equivalence class type-length-value element.

14. The device of claim 13, wherein the advertisement includes:
a forwarding equivalence class type-length-value.

15. The device of claim 12, further comprising:
a label information base that includes network path information related to the pseudowire.

16. The device of claim 12, further comprising:
line cards that receive and send packets to and from attachment circuits that are connected to the device.

17. The device of claim 16, wherein the attachment circuits include at least one attachment circuit for one of asynchronous transfer mode packets, frame relay packets, or time division multiplexed packets.

18. A device comprising:
logic to:
create an advertisement label mapping message to advertise a multifunctional control channel in an interface parameter sub-type-length-value of the advertisement label mapping message;
set a connectivity verification types field bits within a virtual circuit connectivity verification parameter field in the advertisement label mapping message to indicate types of control messages that may be sent through the multifunctional control channel;
dispatch the advertisement label mapping message to a network device;
process a reply label mapping message that is transmitted from the network device in response to the advertisement label mapping message; and
update a label information base to establish a pseudowire associated with the multifunctional control channel.

19. The device of claim 18, wherein the logic is further configured to:
form a control message; and
send the control message over the multifunctional control channel.

20. The device of claim 18, wherein the logic is further configured to:
obtain information about a local attachment circuit and a remote attachment circuit connected to the network device; and
incorporate the information about the local attachment circuit and the remote attachment circuit into the advertisement label mapping message.

* * * * *